Nov. 26, 1963 H. C. HUMPHREY Re. 25,485

WEIGHTED DRILL COLLAR

Original Filed Nov. 21, 1957

INVENTOR
HOWARD C. HUMPHREY

BY

ATTORNEY

United States Patent Office

Re. 25,485
Reissued Nov. 26, 1963

25,485
WEIGHTED DRILL COLLAR

Howard C. Humphrey, Liberty, Tex., assignor to Texaco Inc., New York, N.Y., a corporation of Delaware Original No. 2,958,512, dated Nov. 1, 1960, Ser. No. 697,824, Nov. 21, 1957. Application for reissue Sept. 13, 1961, Ser. No. 139,818
3 Claims. (Cl. 189—26)

Matter enclosed in heavy brackets [ ] appears in the original patent but forms no part of this reissue specification; matter printed in italics indicates the additions made by reissue.

This invention relates generally to well drilling and specifically is concerned with an improvement in drilling tools.

In rotary drilling, the bit is rotated, with weight being applied to it in order to obtain effective cutting. As the well bore increases in depth, lengths of drill pipe, each 30 feet long are added to form the drill stem. Through this drill pipe, drilling fluid is provided to the bottom of the well bore, where the bit cuttings are picked up and brought to the surface.

Frequently, these cuttings and other detritus form such a compact mass that the drilling fluid is unable to carry the matter away, the drill stem becomes wedged in the well bore and is unable to rotate the bit for further drilling. When such an incident occurs, as much as possible of the drill stem is salvaged by unscrewing individual lengths of the drill pipe and the remainder of the drill stem is abandoned.

This is an expensive proposition since the drill stem adjacent the bit comprises the drill collar, which is distinct from the drill pipe. This collar is essential to drilling operations because it functions through its weight and rigidity to keep the hole straight. It keeps weight on the bit without compression on the drill pipe and thereby aids in avoiding hole deviation.

The drill pipe, on the other hand, transmits torque, circulates mud, and is relatively too flexible to contribute much weight at the bottom of the drill hole without bending.

Conventional drill collars are made of solid steel billets to obtain the necessary weight, with the center machined out to the desired inside diameter. A costly limitation is associated with this method of construction because the outside diameters are large enough to prevent adequate "washing over" in those cases where the collars become stuck.

These collars are commonly 30 feet in length, with from 1 to 20 of them joined together for drilling a single well. Each length ranges in cost from $500 to $1,000 or more so that it is expensive when all the drill collars have to be abandoned when stuck. The conventional drill collar ranges in inside diameter from 1½" to 4" and outside diameter from 4¼" to 8¼".

Accordingly, it is an object of the invention to provide an improved drill collar which has a lesser outer diameter and yet is substantially as heavy as those of conventional construction.

It is another object of the invention to provide an improved drill collar which is simple and inexpensive to manufacture.

Still another object of invention is to provide an improved drill collar which is more susceptible to salvage and recovery operations.

Figure 2:
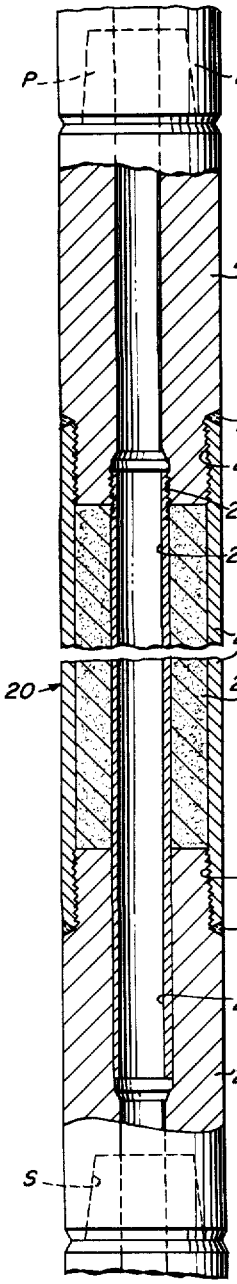
Figure 1:
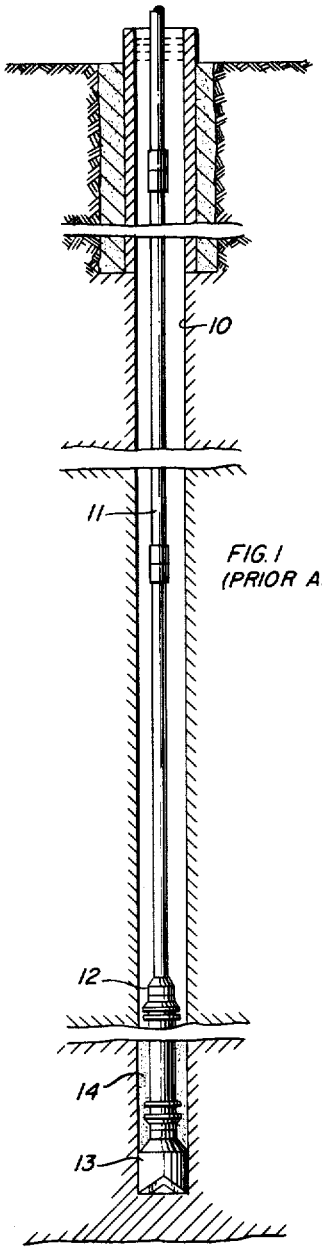
FIG. 1 (PRIOR ART)

These and other objects, advantages and features of the prseent invention will become apparent from the following description of the invention and by reference to the accompanying drawing wherein:

FIG. 1 is a partial diagrammatic vertical section of a typical prior art bore hole indicating how the present invention would be applied; and FIG. 2 is a cross section of my improved drill collar.

In accordance with the illustrated embodiment of my invention, there is shown a composite structure in which an alloy having a specific gravity greater than conventional steel is used to provide the required weight in a drill collar.

Referring to FIG. 1, a typical prior art bore hole extending into the earth is disclosed at 10, in which the drilling means are shown as comprising a string of drill pipe 11, connected to the drill collar 12, to the lower end of which is secured a rotary drill bit 13, which, upon rotation of the drilling means, produces the bore hole. As the drilling progresses, cuttings and other chips 14, removed by the bit 13, are carried to the surface and deposited in a manner well known and so not illustrated here.

FIG. 2 discloses the composite drill collar 20, as comprising tool joints or threaded end sections, with the *section having the* external threaded *pin* [section] *P* at 21 and the *section having the* internal threaded *socket* [section] *S* at 22. Standard size drill pipe*s*, shown at 23 and 24, respectively form the inner and outer walls of the drill collar, and are fastened to the end sections, either by screw threading and/or welding, e.g., as between section 22 and pipe 23, thereby defining an annular chamber. The annular chamber is [then] filled with lead or lead alloy 25 *prior to final fastening. The fastening is shown by the threaded connections at 21a and 21b between the tool joint 21 and the pipes 23 and 24 and by the outside weld at 24a, and by the threaded connection between tool joint 22 and pipe 24 at 22a and by the outside weld at 24b.*

The drill collar can be fabricated to any dimension for use in drilling, *and usually is* based on standard size drill pipe. *Thus, when such a composite drill collar, using standard size drill pipe, is attached to a drill string of drill pipe having the same outer diametral dimension as the composite drill collar, then the drill string would have a uniform outer diametral dimension. (See FIG. 2.)* When a 7 inch outside diameter pipe is used with a 2½ inch drill pipe centered internally, with both joined to 7 inch tool joints or end sections and the annulus thus formed filled with a lead alloy, the following comparison of dimensions and weights of drill collars illustrates the advantages to be gained:

| | Conventional Drill Collar | Improved Drill Collar |
|---|---|---|
| Outside Diameter, inches | 7¾ | 7 |
| Wgt., with 2" I. D., pounds | 4,500 | 4,600 |

With the use of a conventional 7¾" drill collar for drilling a 9⅞" *bore* hole, the clearance on each side of the drill collar is 1 1/16". In the event the drill collar becomes stuck, this small clearance to get over *the drill collar* [it] with a rotary shoe and wash pipe in order to "wash over" and clear away the wedged detritus *between the drill collar and the bore hole* is such that more failures to complete the "wash over" than successes result.

With the improved drill collar, having an outside diameter of 7", the clearance on each side is 1 7/16", which is enough to permit the rotary shoe and wash pipe to "wash over" it and clear out the detritus.

The weights and strengths of materials used are also advantageous. Steel specific gravities fall in the approximate range of 8.2 and lower, while *lead and* lead alloys fall in the range of 9.4 to 11.3. ASTM Grade 19 lead-base Babbitt has a tensile strength of 10,000 p.s.i. as compared to the tensile strength of 1,500 p.s.i. for cast lead. This particular Babbitt contains about 5% tin, 9% antimony and 86% lead. A comparative lead alloy with 10% antimony has a tensile strength of 8,000 p.s.i.

Thus, there has been disclosed and described a novel and improved drill collar which[,] *is adapted to be attached to the drill string of drill pipe having the same outer diametral dimension, and* when compared with the conventional drill collar, is relatively easy to salvage, is less costly to fabricate, and has greater weight with smaller outside diameter.

Obviously, [many] *other* modifications and variations of the invention[,] as hereinbefore set forth[,] may be made without departing from the spirit and scope thereof, and therefore only such limitations should be imposed as are indicated in the appended claims.

I claim:

*1.* A drill collar of composite construction comprising threaded end sections and inner and outer pipe members joined thereto in concentrically spaced relationship to each other thereby defining an annular chamber therewith, said pipe members being equal to and not greater than standard size drill pipe with conventional diametral dimensions, said drill collar being adapted to be attached to a drill string having the same outer diametral dimension, each of said threaded end sections having the same outer diametral dimension as the outer pipe member and having an axial passageway with the same inner diametral dimension as that of the inner pipe member, and a metallic material completely occupying said annular chamber and having a higher specific gravity than said pipe members and said end sections [and with comparable tensile strength] to provide a drill collar of substantially the same or greater weight and of lesser outer diametral [dimensions] *dimension* in comparison with a conventional integral drill collar, said metallic material comprising an alloy of lead having a specific gravity ranging from 9.4 to 11.3.

*2. A drill collar in accordance with claim 1, wherein said end sections and said outer pipe member are threaded for fastening to each other, and wherein a weld at the exposed end of each of the screw joints between said end sections and said outer pipe member prevents unscrewing.*

*3. A drill collar of composite construction comprising end sections and inner and outer pipe members joined thereto in concentrically spaced relationship to each other thereby defining an annular chamber therewith, said drill collar being adapted to be attached to a drill string having the same outer diametral dimension, each of said end sections having the same outer diametral dimension as the outer pipe member and having a passageway in coaxial communication with the inner pipe member, and a metallic material completely occupying said annular chamber and having a higher specific gravity than said pipe members and said end sections to provide a drill collar of substantially the same or greater weight and of lesser outer diametral dimension in comparison with a conventional integral drill collar, said metallic material being selected from the group consisting of lead and an alloy of lead having a specific gravity ranging from 9.4 to 11.3.*

References Cited in the file of this patent or the original patent

UNITED STATES PATENTS

| | | |
|---|---|---|
| 1,518,644 | Fether | Dec. 9, 1924 |
| 1,731,171 | Miller | Oct. 8, 1929 |
| 1,746,132 | Stokes | Feb. 4, 1930 |
| 2,100,419 | Wright | Nov. 30, 1937 |
| 2,126,075 | Wright | Aug. 9, 1938 |
| 2,259,191 | Allen | Oct. 14, 1941 |
| 2,328,856 | Stone | Sept. 7, 1943 |
| 2,423,213 | Weber | July 1, 1947 |
| 2,814,462 | Jarnett | Nov. 26, 1957 |
| 2,958,512 | Humphrey | Nov. 1, 1960 |